United States Patent [19]

Dietrich et al.

[11] Patent Number: 4,873,521

[45] Date of Patent: Oct. 10, 1989

[54] ADDRESS ADMINISTRATION UNIT OF A MULTI-PROCESSOR CENTRAL CONTROL UNIT OF A COMMUNICATIONS SWITCHING SYSTEM

[75] Inventors: Klaus Dietrich, Sauerlach; Hans Hauer, Munich; Klaus Schreier, Penzberg, all of Fed. Rep. of Germany

[73] Assignee: Siemens Aktiengesellschaft, Berlin and Munich, Fed. Rep. of Germany

[21] Appl. No.: 101,184

[22] Filed: Sep. 25, 1987

[30] Foreign Application Priority Data

Sep. 25, 1986 [DE] Fed. Rep. of Germany ....... 3632608

[51] Int. Cl.$^4$ .............................................. H04Q 3/00
[52] U.S. Cl. .......................... 340/825.52; 340/825.07; 364/200
[58] Field of Search .......... 340/825.07, 825.3, 825.21, 340/825.52, 825.53; 370/124, 85; 379/93, 94, 95; 364/200 MS File, 900 MS File

[56] References Cited

U.S. PATENT DOCUMENTS

| 4,145,745 | 3/1979 | De Bijl et al. | 364/200 |
| 4,163,280 | 7/1979 | Mori et al. | 364/200 |
| 4,466,056 | 8/1984 | Tanahashi | 364/200 |

FOREIGN PATENT DOCUMENTS

| 1151309 | 8/1983 | Canada | 340/825.52 |
| 2533736 | 4/1984 | France | |
| 0111557 | 6/1984 | Japan | 340/825.52 |
| 0176163 | 9/1985 | Japan | 340/825.07 |

OTHER PUBLICATIONS

Hu et al., "Memory-Management Units Help 16 Bit μPs to Handle Large Memory Systems", Electronic Design, vol. 28, Apr. 1980, pp. 128–135.
Intel, Advance Inform 80386 High Performance Microprocessor with Integrated Memory Management, 10-85, Order No. 231631-001, 10/85.
Electrical Engineering, "Memory Management with the M68000 Family", Mar. 1985, pp. 47–49.
Klaus Schreier, "High Throughput Processing Scheme in Digital Communications", International Zurich Seminar on Digital Communications, Mar. 1986, pp. 213–218.

Primary Examiner—Donald J. Yusko
Assistant Examiner—Eric Oliver Pudpud

[57] ABSTRACT

An address management unit is provided for the conversion of logical addresses contained in a program into physical addresses for a multi-processor central control unit of a computer-controlled communications switching system comprising a central bulk storage, and additional memories in the processors, and peripheral units, a logical address forms a polysyllable address word of which one address syllable corresponds to the logical starting address of a logical address space and the other address syllable corresponds to the logical address within this logical address space. A special-purpose memory serves the purpose of storing four-syllable words having a long word length which are respectively stored therein under the addresses formed by the one address syllables. The four word syllables each correspond to a specific control signal in which the first word syllable corresponds to the address of the physical address space, the second syllable corresponds to the plurality of physically-present addresses of the physical address space to be selected, the third syllable corresponds to the total physical object to be selected, and the fourth syllable corresponds to respective information concerning access rights, whereby the fourth syllable monitors the access to the unit to be selected in accordance with the third word syllable.

6 Claims, 2 Drawing Sheets

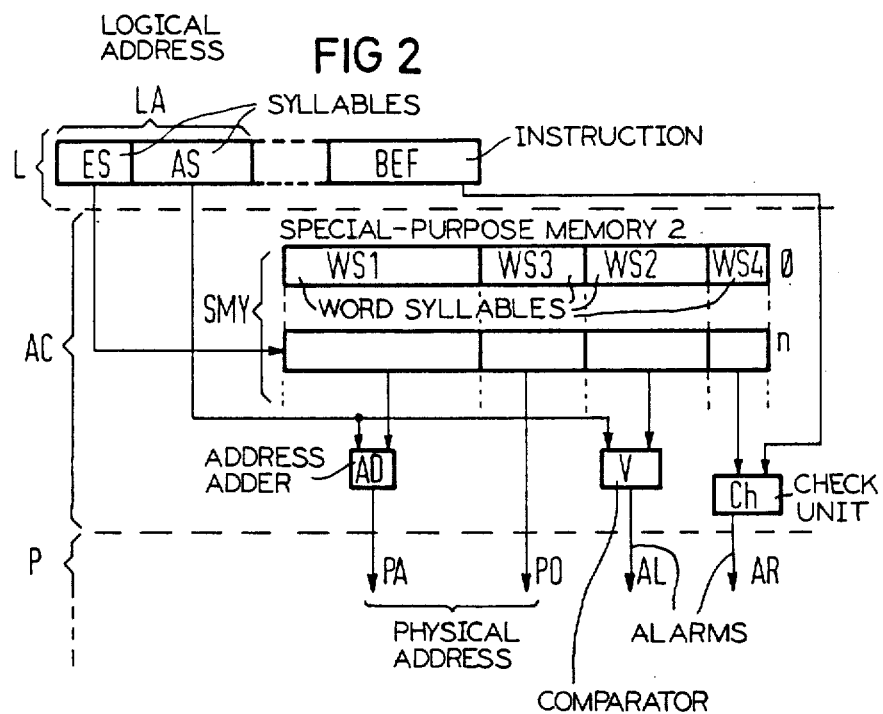

ADDRESS ADMINISTRATION UNIT OF A MULTI-PROCESSOR CENTRAL CONTROL UNIT OF A COMMUNICATIONS SWITCHING SYSTEM

BACKGROUND OF THE INVENTION

1. Field of the Invention

The present invention is directed to an improvement of the specific address management unit for the conversion of local addresses contained in a program and composed, for example, of 32 bits into physical addresses composed of, for example, 32 bits, in which a multi-processor central control unit of a computer-controlled, communications switching system is provided in which the system comprises a central bulk storage and additional memories, for example, additional local memories of the various central processors which collaborate with the bulk storage by way of a central bus system and which comprises peripheral units, and in which the logical address represents an address word comprising at least two address syllables of which one address syllable is composed of, for example, 11 bits corresponding to the starting address of a logical address space which may be composed, for example, of 32 bits, and the other address syllable is composed of, for example, of 21 bits and corresponds to the address within this logical address space, such as known from a International Zurich Seminar on Digital Communications, March 1986, pp. 213-218, particularly Page 216, right-hand column and FIG. 3.

2. Description of the Prior Art

Units of the type set forth above are used in the art for the calculation of physical memory addresses and are therefore generally referred to as memory management units, for example Intel, Advance Inform 80386 High Performance Microprocessor with Integrated Memory Management, October 1985, Order No. 231631-001;

Motorola, description of the module MC 68451, for example in the product catalog pages 4-818 through 4-835; and Electrical Engineering, March 1985, pp. 47-49.

The multi-processor central control unit of the communications switching system can be constructed, for example, and operated in accordance with U.S. Ser. No. 651,954, filed Sept. 19, 1984 now abandoned. The invention, however, is not limited to this specific structure and to the specific operating mode of the central control unit.

SUMMARY OF THE INVENTION

Such a program-controlled central control unit representing a special-purpose computer which, for example, must process all switching jobs for 100,000 telephone subscribers which are to be centrally handled should often comprise not only an extremely high availability, an extremely high error tolerance, an extremely high calculating speed and a high parallel processing capacity in order to handle each individual, arising switching job as immediately as possible with great reliability, whereby the central processors can at least largely mutually replace one another, i.e. should be capable of assuming identical switching jobs, and whereby there are numerous different switching jobs, for example, calling, routing, charge acquisition, call clear down, call progress tone input, etc.

In addition, such a central control unit should also be optimally easy to program, no matter how diverse its jobs may be and no matter how many central processors operated independently side-by-side it may contain.

The programming of computers is already facilitated in the art with address or, respectively, memory management units which convert the addresses in the programs, first contained therein in virtual form because of the easy programmability, into the respectively real, physical addresses.

According to the invention, the address management unit should always be capable of resolving an extremely complex job. It should make it possible that the programmer of the central control unit need not exactly know the structure and the internal functioning of the central control unit. The programmer, in particular, can constantly use logic addresses and logic address spaces. When the central control unit is enlarged or reduced in size, i.e. consequently has an extremely different structure, for example twice as many central processors and twice as many local memories as previously, the old program of the central control unit that contains only the logic addresses and logic address spaces can continue to be utilized. Essentially, only the memory content of the special-purpose memory to be set forth later need be adapted given such a type replacement of the central control unit.

As needed, furthermore, it should allow the access rights to be checked, for example a check to see whether the selected parts (for example memory areas) are only allowed to be read but not written or, for example, whether their selection should be dependent on additional conditions, for example whether a calling subscriber is allowed to interrogate the counter reading of another subscriber or whether a fine alarm state is present at that time during which the desired access is presently forbidden.

As needed, it should also allow the conversion not only of logic addresses of memory locations and should also be employed for the conversion of logical addresses into physical addresses of other, for example peripheral units.

Therefore, for example, for the conversion of logical addresses into physical addresses of specific telephone connections of a telephone switching system is provided whereby the logical address space which contains the appertaining logical address can then physically correspond, for example, to a specific group of such telephone connections, i.e. to the telephone connections of a specific city neighborhood, and whereby the physical address of this specifically selected telephone connection can be, for example, the telephone subscriber number or, perhaps, only the address of a specific unit of this subscriber, for example a specific picture screen portion of a video telephone connection.

Since the present invention also enables logical, i.e. virtual addressing of such peripheral units, it generally does not represent merely a memory management unit but also represents a general address management unit.

As needed, it should also greatly facilitate the production of programs for the extremely complex central control unit, whereby the programmer initially need not know either the physical address or the real location of the unit to be selected, but only that programmer who determines the concrete conversion of the logical address into the physical address in detail on the basis of an appropriate loading of the special-purpose memory need make the real physical address available to the address management unit for this purpose. Given the present invention, therefore, only the logical addresses need again be specified in the new programs of the central control unit given a change of the program of the central control unit, but the physical addresses no longer have to be specified so that this also greatly facilitates the modifications of these programs.

As needed, it should also check whether the physical address space is adequately large in order to be able to select the desired, physical address, namely whether the selected physical address corresponding to the other address syllable is present at all within the selected physical address space which corresponds to the one (1st) address syllable.

Above all else, in addition, it should also allow the same physical address, for example 0000 0000 0000 0001 to be multiply assigned, namely once for each of the various physical address spaces; when, for example the various physical address spaces are respectively formed by two different memories, for example by the local memory of a central processor and by the central, bulk storage, then, according to the present invention, the same physical address can be assigned once for the appertaining, local memory and once for the central, bulk storage.

Apparatus constructed in accordance with the present invention should also allow a logical address space to be divided onto a plurality of different, physical organs, i.e. onto a plurality of different, physical memories, without the programmer of the central control unit needing to know anything about the same because he need only specify the logical address space, whereby only the logical addresses of the memory locations of these memories need differ from one another, but the physical addresses of these memory locations no longer have to differ from one another. This also considerably facilitates the production and modification of the programs for the central control unit because only the logical addresses still have to be indicated in the program in these cases.

In principle, for example, the programmer need not know at all whether he is selecting the local or the central memory. This can be separately determined therefrom when loading the address management unit constructed in accordance with the invention (i.e. at arbitrary times, for example, therefore even subsequently).

Furthermore the management unit should also allow segmenting and not only page-by-page addressing (paging).

It should simultaneously resolve all of these sub-jobs with very little hardware expense and should nonetheless absolutely achieve the extremely high conversion rate needed in such a central control unit of an extremely large switching system.

The unusually complex job which has not been resolved overall yet by any known memory management unit is achieved in a simple manner, i.e. particularly elegantly in an address management unit for the conversion of logical addresses contained in a program and composed, for example, of 32 bits, into physical addresses composed, for example, of 32 bits, for a multiprocessor central control unit of a computer-controlled communications switching system comprising a central bulk storage and additional memories, for example, additional local memories of the various central processors which collaborate with the bulk storage by way of a central bus system, and comprising peripheral units, whereby the logical address represents an address word comprising at least two address syllables of which the one address syllable (for example composed of 11 bits) corresponds to the starting address composed, for example, of 32 bits, of a logical address space and the other address syllable, composed for example of 21 bits, corresponds to the address within this logical address space. The unit is particularly characterized in that, for example, for converting logical addresses into the physical addresses of memory locations in one of the memories and/or into the physical addresses of peripheral units, it contains a special purpose memory for storing words containing at least four word syllables and having a long word length which are stored therein under the respective addresses, for example 2048 different addresses, formed by the one address syllables, and also contains an address adder and a comparator. The four word syllables each correspond to a defined control signal, namely the first word syllable containing, for example, 32 bits corresponds to a physical starting address of a physical address space in the local memory. The second word syllable containing, for example, 21 bits, corresponds to the respectively highest physical address, i.e. to the plurality of physically-existing addresses of the physical address space to be selected in the local memory, for example to the plurality of addresses of the appertaining memory area in the memory to be selected or to the plurality of addresses within the appertaining group of the peripheral unit to be selected or to the plurality of addresses within the I/O units to be selected. The third word syllable corresponds to the entire physical object to be selected, for example to the address of memories to be selected or of peripheral units to be selected, etc. The fourth word syllable respectively corresponds to information about access rights, for example about a read-only right comparing with the instruction in the program step or about rights that are assignable only in special operating cases, for example given original start, re-start or specific alarm cases. The address adder, for example, 32 bits wide, respectively adds the other address syllable and the first word syllable. The comparator, for example 21 bits wide, respectively compares the other address syllable to the second word syllable. The fourth word syllable monitors the access to the unit to be selected according to the third word syllable, for example monitoring with a check unit.

According to a particular feature of the invention, the length of all word syllables is independent of the address of these word syllables in the special-purpose memory which allows a particularly simple structure and a particularly simple operation of the special-purpose memory, as well as of the address adder and of the comparator. According to another feature of the invention it is multiply provided, namely a respective address management at each central processor or, respectively, central processor pair comprising its own local memory, which allows particularly fast conversions to be achieved.

According to another feature of the invention, the unit is also respectively provided for at least a part of the I/O units or, respectively, I/O unit pairs which comprise their own local memory which allows a particularly fast operation of the input/output units which are extremely heavily loaded in such a central control unit.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a schematic illustration of an example of the structure of an address management unit constructed in accordance with the present invention.

DESCRIPTION OF THE PREFERRED EMBODIMENTS

Figure 1:
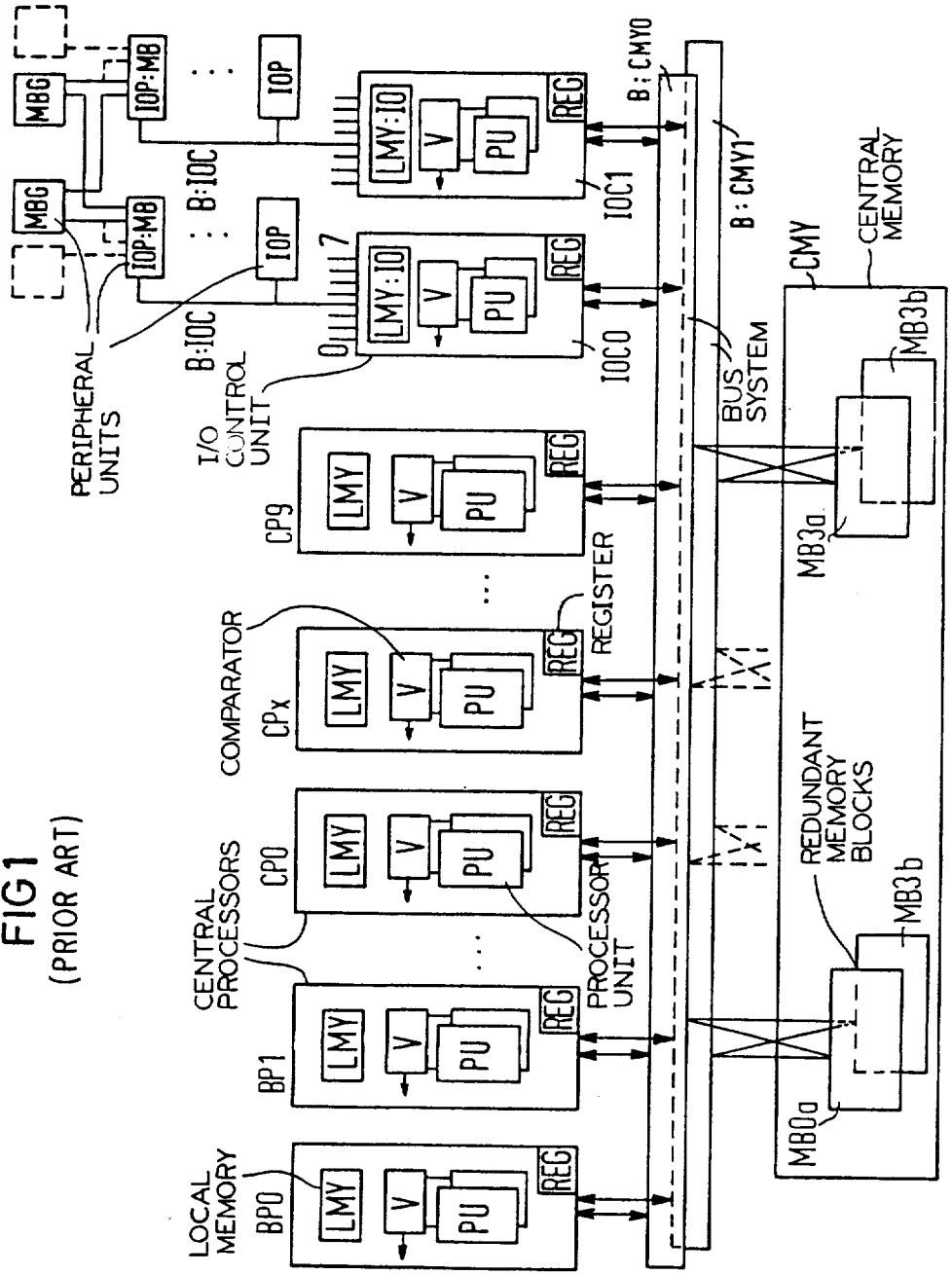
FIG. 1 is a schematic illustration of a known example of the most important elements of a switching system of the type set forth above.

The invention relates to the address management of a multi-processor central control unit of a switching system, for example of a telephone switching system. FIG. 1 schematically illustrates an example of such a central control unit. Illustrated on the drawing is a plurality of central processors, for example 12 different central processors BP, CP comprising redundant 32-bit processor units PU and a local memory LMY each. They serve the purpose of handling switching jobs. The central 32-bit processors BP generally differ from the other central 32-bit processors CP in that the processors BP assume specific, additional jobs, for example given disturbances in the switching system.

Also illustrated is a central memory CMY which, for the sake of security, is composed here of redundant memory blocks MB and to which the central processors BP, CP have access via a bus system B:CMY which is likewise redundant and which respectively transmits the 32 bits in parallel. High operating reliability and, therefore, extremely high availability are achieved by the redundancies.

The aforementioned U.S. patent application and many European and German patent applications recite many exemplary details regarding jobs and operating modes of the various components or, respectively, elements of the above example which are shown, for example via the peripheral units IOP, MBG and the central bulk storage CMY, via the additional, local memories LMY, and other special characteristics of the various central processors BP which collaborate with the bulk storage CMY via the central bus system B:CMY. Repetitions of this nature can therefore be omitted here.

FIG. 2 illustrates an exemplary embodiment of the address management unit AC of the present invention for conversion of the logical address LA contained in a program step L into the physical address PA, PO for the example of the multiprocessor central control unit of a communications switching system shown in FIG. 1. For example, this address management unit AC therefore serves the purpose of converting logical addresses LA into the physical addresses PA, PO of memory locations in one of the memories LMY, CMY and/or for conversion into the physical addresses PA, PO of peripheral units IOP/MBG and/or for conversion into the physical addresses PA, PO of input/output units IOC between the central control unit and the peripheral units IOP/MBG.

Here, the logical address LA represents an address word composed, for example, of 32 bits and comprising at least two address syllables ES, AS of which the one, first address syllable ES composed, for example, of 11 bits corresponds to the address ES in the special purpose memory SMY under which the physical starting address WS1 of the selected, logical address space is stored; it "corresponds to" therefore denotes it "is identical to" or it "correlates", for example by inverting all zeros to ones and ones to zeros.

At the same time, the true address WS3/P0 of that physical address space that is to be specifically selected for a logical address syllable ES is stored under the address ES in the special-purpose memory SMY. By addition of the other logical address syllable AS and of the physical starting address WS1 with the address adder AD the physical address PA within this physical address space WS3/P0 is respectively obtained. The address management unit AC contains a special-purpose memory SMY for storing, for example, 2048 different words WS having a long word length under 2048 addresses ES and also contains an address adder AD, a comparator V and a check unit Ch.

The addresses ES of the memory locations of the special-purpose memory SMY therefore correspond to the one, first address syllables ES of the logical addresses LA, so that the physical addresses WS1/WS3 stored in the special-purpose memory SMY can be read with these address syllables ES. The words WS stored in the special-purpose memory SMY, however, each contain at least four word syllables WS1–WS4.

The first word syllable WS1 containing, for example, 32 bits respectively corresponds to the physical starting address WS1 or, respectively, PA of the physical address PA to be selected, for example within the local memory LMY of one of the central processors CPx.

The second word syllable WS2 containing, for example, 21 bits like the other, second address syllable AS respectively corresponds to the highest address of the physical address space selectable with the address syllable ES, i.e. to the plurality of physically-existing addresses of the physical address space to be selected. This second address syllable WS2, therefore, corresponds, for example to the plurality of selectable addresses of the memory (cf. LMY or CMY) to be respectively selected with the address syllable ES or corresponds to the plurality of respectively selectable addresses of the peripheral units IOP/MBG or input/output units IOC.

The third word syllable WS3 corresponds to the address P0 or, respectively, to the control line P0 of the physical element, for example the memory LMY of the processor CPx to be respectively selected.

The fourth word syllable WS4 respectively corresponds to information concerning access rights, for example information which are to be compared to the instruction BEF of the program step L with the check unit Ch. This information, therefore, relate to a read-only right or to a right that is only granted in special operating cases, for example given original start, restart of special alarm cases.

In addition to the aforementioned bits, the syllables ES, AS and WS1–WS4 can also contain additional bits, for example parity bits or an error detection code (EDC code) for checking for errors.

The comparator V which, for example, is 21 bits wide respectively compares the other, second address syllable AS or the respective addition result PA of the address adder AD on the one hand to the second word syllable WS2 on the other hand, whereby a test is undertaken to see whether addresses which do not physically exist are being selected; if necessary, the comparator V then triggers an alarm AL.

The fourth word syllable WS4 monitors the access to the element P0 to be selected in accordance with the third word syllable WS3, monitoring the same with the check unit Ch, whereby the check unit Ch here either triggers an alarm AR when there is no access right or emits an enable signal when there is an access right. According to the invention, therefore, and in other words, the address LA is divided into a first address syllable ES which is generally composed of the high-order locations of the address AL and into another address syllable AS, which is here the second address syllable AS. Different address syllables ES, here the first address syllables ES can be assigned, for example, to different software components. Lines or, respectively, regions in the special-purpose memory specifically provided for this purpose are addressed with the one address syllables ES, these lines or, respectively, regions containing the necessary data for the selection of the logically-addressed elements to be selected.

More specifically, a first word syllable WS1 corresponds to a starting address or base address which has the other address syllable AS added thereto for forming the resultant physical address.

An indication word WS2 defines the allowable address space for the base address WS1.

An identifier word WS3 specifies the assigned, physical address object, f.i. a particular system organ or a big region of a big memory, f.i. one of the central memory blocks MB.

In addition, various identifiers WS4 correspond to the admissible types of cycles, for example "writing allowed", computer states, for example "alarm because of hardware defect" and/or program states, for example "admissible given this control section" or "admissible given this switching program section".

As needed, these identifiers WS4 which form the fourth word syllable WS4 can contain a great number of bits. In particular, they can respectively represent their own catalog of access rights, whereby individual rights contained in the catalog are compared, for example with an own comparator, to the status of the program, of the central control unit or to the part BEF of the program step. In order to be able to check with this latter identifier WS4, the corresponding particulars, for example BEF, can be supplied together with the logical address LA (for example, reading, writing), or can be derived from the program or, respectively, from the appertaining element of the central control unit, (for example, computer state, or execution priority) or can be generated by the program or by that element (for example, loading a software or task identification).

In every selection, i.e. logical addressing LA, these four word syllables or, respectively, informations WS1-WS4 are preferably read in parallel and processed in parallel. In case of error, the desired selection is not started but, for example, all indices that were evaluated in the check unit Ch are frozen in and an error handling program or, respectively, error search program is started. Modern high-performance microprocessoss having, for example, a respective width of 32 bits allow a fast error handling for this purpose having a potential of alternate executions and/or repetition attempts of the selection initially not allowed, i.e. of the rejected access, in order to avoid or to minimize reactions on the operation of the central control unit.

A fast operating special-purpose memory SMY which can contain the informations WS1-WS4 for a plurality of independent software components, (for example, 2048 informations WS1-WS4 given an 11-bit width of the one address syllable ES), is provided in order to minimize the dynamic losses for the conversion cycle execution. After initialization of the central control unit, reloading events during the operation of the central control unit are therefore avoided or minimized.

One of the main advantages of the address management unit (access control) provided by the present invention is the achievement of the described multitude of functions which can definitely be present in isolation in known memory management units, but which are realized combined here and adapted to one another elegantly in a simple manner. In particular, no address management unit has been heretofore disclosed which, like the present invention, both simultaneously manages a great plurality of segments, for example 2048, and also manages the accesses to a plurality of different physical address spaces without having different logical address spaces being prescribed for these accesses.

The present invention can also be utilized in arbitrary even in a plurality of types of multiprocessor central control units without preliminary performances on their part. Furthermore, an arbitrary, already existing high-level language software can be used with only potential, extremely slight adaptations to modified hardware and to software environments. With the word syllables WS2 and WS3, furthermore, the invention also allows accesses only in prescribed address spaces. In addition, according to the invention, all program steps connected with the selection, cf. BEF, are monitored, for admitting particular types of cycles, for example reading, whereby additionally particular status identification signals of the central control unit, for example alarms, and particularly status identifications of the program, can be managed by the fourth word syllable WS4.

With the third word syllable WS3, moreover, the present invention assigns different, prescribable physical address spaces, for example address spaces formed by peripheral elements IOP/MBG.

In case of error, moreover, the present invention allows evidences to be secured, i.e. especially with the third and/or fourth word syllable, these f.i. directly indicating faults in software, enabling an effective error elimination and/or allowing an on-line resumption of the software after the error handling (without or with staggered recovery measures in case of a restart of the central control unit, or of the whole switching system), whereby evidences securing and error elimination is possible according to the invention for a plurality of independent sub-programs of the central control unit, i.e. for a plurality of independent software components, in nearly any case without re-initializing, newly re-loading or newly treating the central control unit itself when processing a new component of the programs.

The address management unit according to the present invention comprises a particularly simple structure and a particularly simple operating mode when the length of all word syllables is independent of the address ES of these word syllables WS in the special-purpose memory SMY.

The operating speed of the central control unit is particularly high when the address management unit AC of the present invention is multiply introduced, namely one such respective address management unit AC at each central processor BP, CP or, respectively, central processor pair BP, CP which comprises its own local memory LYM, whereby the third word syllable WS3 is preferably used on one occasion to select the appertaining local memory LMY and is used on another occasion to select one of the various memory blocks MB of the central bulk storage CMY.

When the address management unit AC of the present invention is also respectively attached to at least one part of the I/O units, IOC or, respectively, I/O unit pairs IOC comprising their own local memory LMY, a particularly fast operation of the multi-processor central control unit can be achieved, namely of their extremely heavily loaded IO units as well.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution of the art.

We claim:

1. An address management unit for the conversion of logical addresses with two address portions contained in a program and composed of a first number of digits into physical address composed of any second, namely said first or another, number of digits comprising:
    - a computer-controlled communications switching system including physical objects, namely a multi-processor central control unit having, a central bulk storage, and a plurality of additional memories as local memories in a plurality of central processors, a central bus system connecting said central processors to said bulk storage for collaboration between said central processors and said bulk storage, and a plurality of peripheral units connected to at least one input/output interface which is connected to said central bus system;
    - a special-purpose memory for storing long words containing at least four words address parts stored under a first of said two address portions, the long word length being of a number of digits;
    - an address adder and a comparator in at least one central processor, said processor converting logical addresses into physical addresses of memory locations in one of said additional memories and into the physical addresses of said peripheral units;
    - said four words address parts each corresponding to a defined control signal in which the first word address part comprises a number of digits and corresponds to a physical starting address of a physical address space in one of said memories, a second word address part comprises a number of digits and corresponds to the respectively highest physical address of the plurality of physically-existing addresses of the physical address space to be selected, a third word address part corresponding to the physical object to be respectively selected, and a fourth word address part which corresponds to information concerning access rights,
    - said address adder operable to add a second of said two address portions and said first word address part, said comparator operable to compare said second address portion to said second word address part, and
    - a check unit in at least said one central processor for receiving said fourth word address part for monitoring the access to a selected object selected according to said third word address part.

2. The address management unit of claim 1, wherein: the length of all word address parts stored in said special-purpose memory is independent of said first of said two addresses.

3. The address management unit of claim 1, wherein: a plurality of said address management units are provided, namely at least one for each central processor.

4. The address management unit of claim 1, wherein: a plurality of said address management units are provided, namely one for a pair of central processors of said plurality of central processors.

5. The address management unit of claim 3, wherein: further address management units are provided for at least some of said peripheral units having local memories.

6. The address management unit of claim 1 wherein the digits are bits.

* * * * *